(12) United States Patent
Wingeier

(10) Patent No.: US 6,842,967 B2
(45) Date of Patent: Jan. 18, 2005

(54) APPARATUS FOR ALIGNING STATORS AND ROTORS

(75) Inventor: Elwood W. Wingeier, Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 151 days.

(21) Appl. No.: 10/115,679

(22) Filed: Apr. 3, 2002

(65) Prior Publication Data

US 2003/0188419 A1 Oct. 9, 2003

(51) Int. Cl.[7] .......................... H02K 15/02; H02K 15/10
(52) U.S. Cl. ............................ 29/598; 29/271; 29/596; 29/724; 29/732; 29/736; 310/42; 310/74
(58) Field of Search .......................... 29/598, 271, 596, 29/724, 732, 736; 310/42, 74

(56) References Cited

U.S. PATENT DOCUMENTS

| | | | |
|---|---|---|---|
| 5,001,412 A | 3/1991 | Carter et al. | ............... 322/10 |
| 5,952,746 A * | 9/1999 | Mittmann et al. | ............ 310/42 |
| 6,204,577 B1 * | 3/2001 | Chottiner et al. | ............. 310/42 |
| 6,253,437 B1 * | 7/2001 | Levin | .......................... 29/271 |
| 6,465,975 B1 | 10/2002 | Naidu | |
| 6,527,091 B2 | 3/2003 | Klode | |

* cited by examiner

*Primary Examiner*—Carl J. Arbes
*Assistant Examiner*—Tim Phan
(74) *Attorney, Agent, or Firm*—Jimmy L. Funke

(57) ABSTRACT

A tool for aligning a stator with respect to a crankshaft of a hybrid vehicle is provided. The tool comprises a central hub, a plurality of alignment members, and an actuating device. The central hub has a mating surface configured to secure the central hub to the crankshaft. The alignment members are configured to engage the stator and are slideably mated with the central hub for movement between a first position and a second position. The actuating device moves the plurality of alignment members between the first and second positions. The second position is further away from the crankshaft than the first position. The stator is moved to an aligned position with respect to the crankshaft when the aligning members are at the second position.

18 Claims, 5 Drawing Sheets

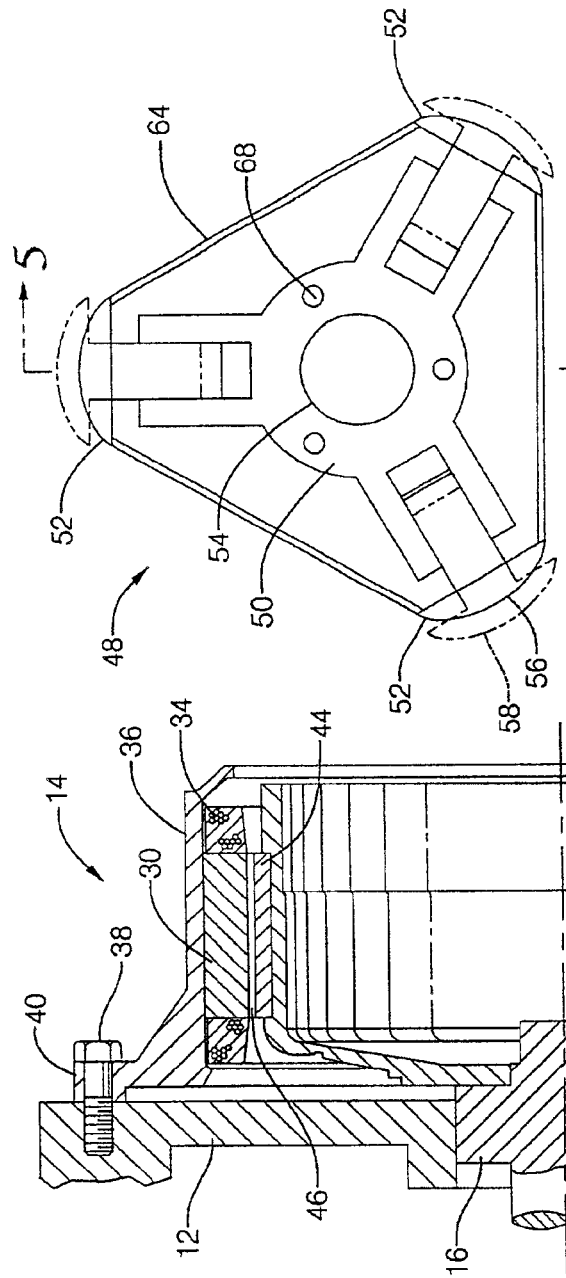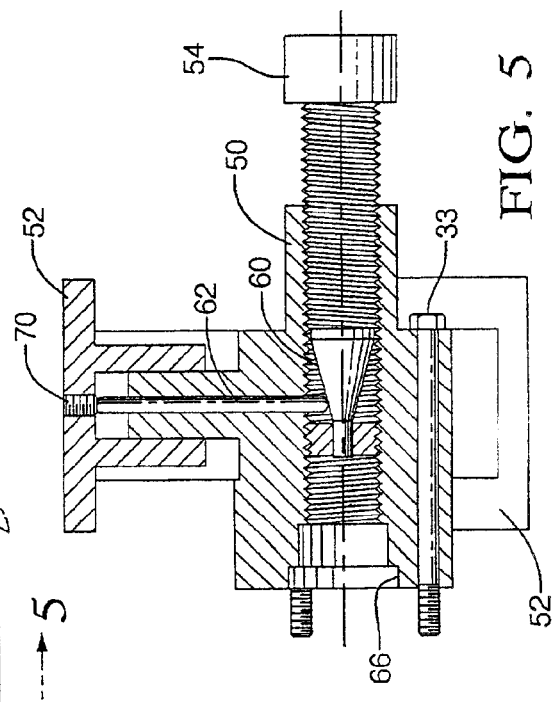

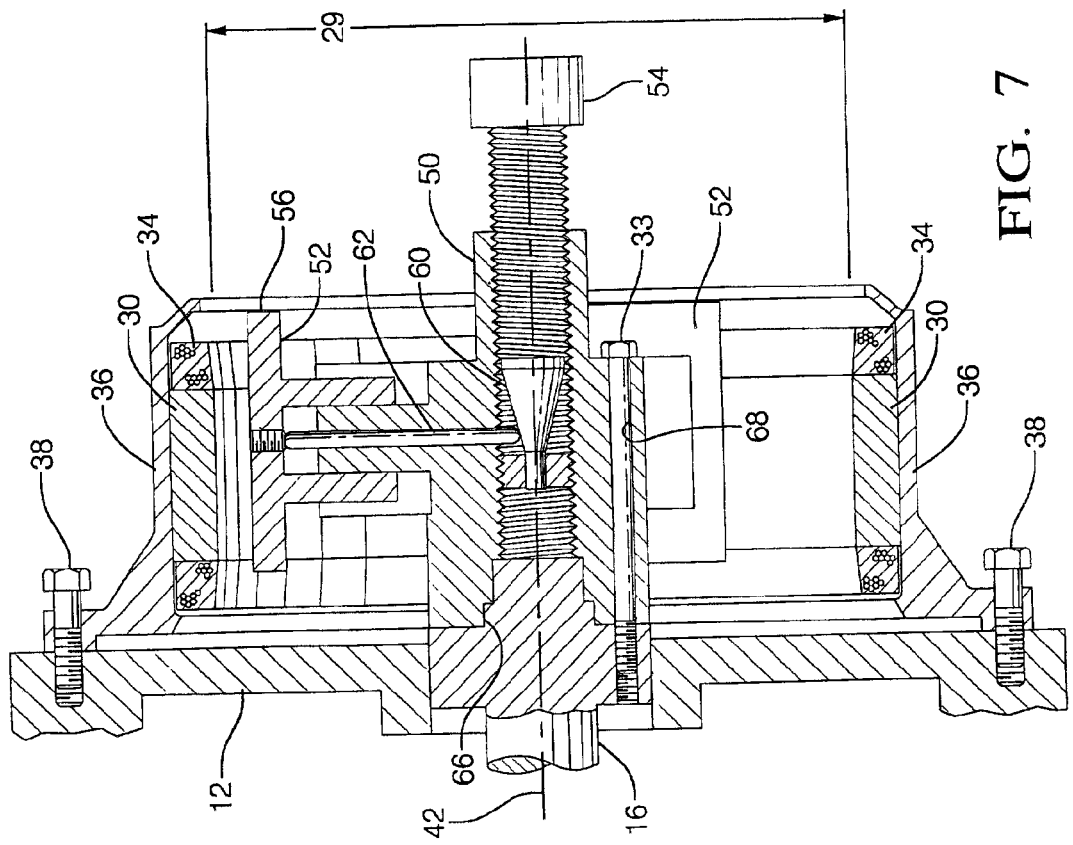
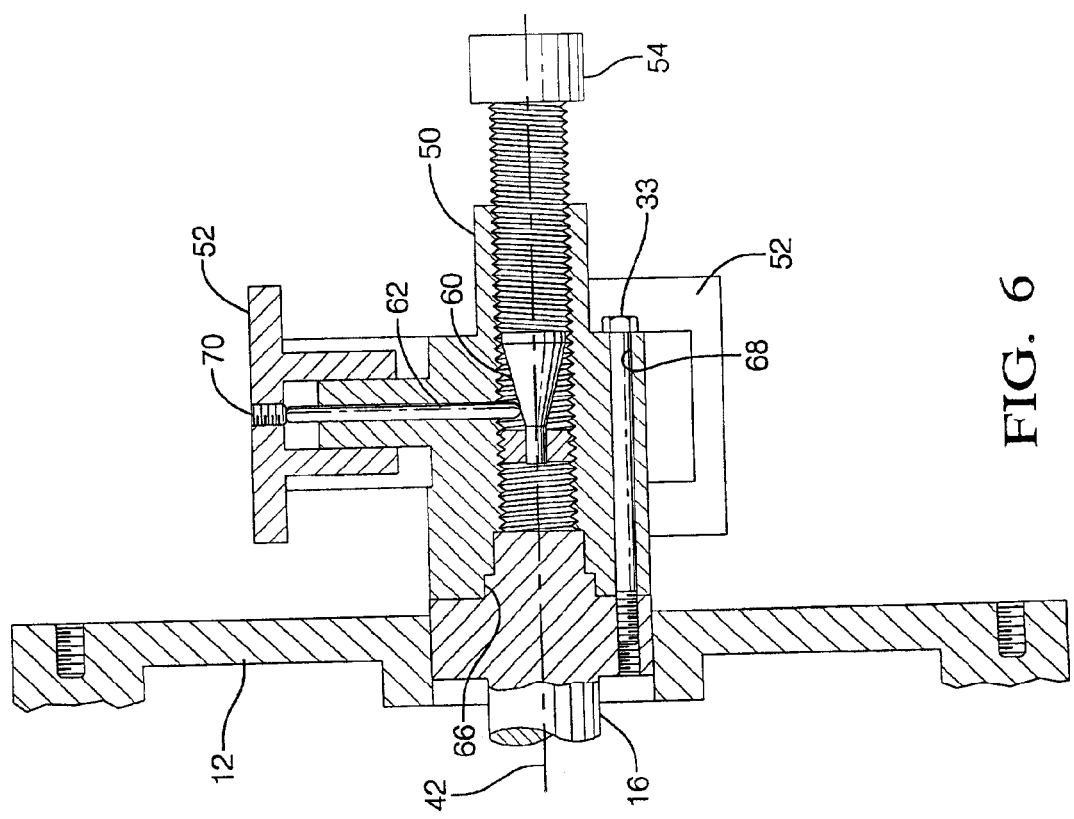
FIG. 7
FIG. 6

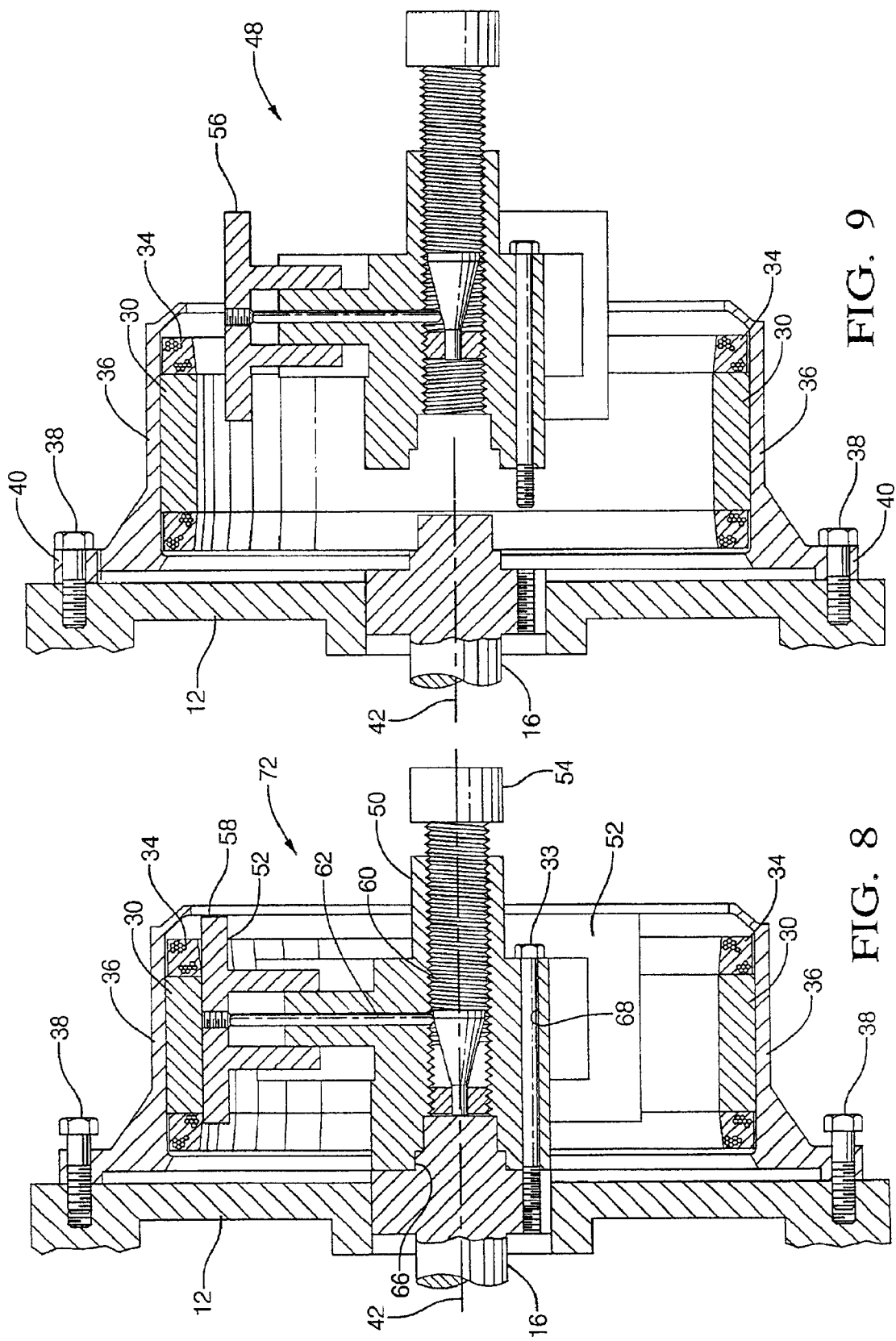

APPARATUS FOR ALIGNING STATORS AND ROTORS

TECHNICAL FIELD

This disclosure relates generally to the securement of an electric machine and alignment of an electric machine. More specifically, this disclosure relates to an apparatus and method for aligning component parts of an electric machine.

BACKGROUND

Internal combustion engines currently include an alternator and a starter motor. The starter motor provides a starting torque to the crankshaft of the engine in order to facilitate the ignition of the engine. The alternator or generator generates an electrical output for meeting the electrical loads of the vehicle, as well as to charge the vehicle's battery.

The concept of using only one electric machine to do both functions, namely starting and generating, adds efficiency. Efficiency is increased because such starting and generating electric machines eliminate the cost of one of the machines and reduce assembly time. It has been proposed to place the combination starting and generating electric machine between the internal combustion engine and the transmission of a hybrid vehicle.

In order to properly assemble the components of such an electric machine, a rotor that is secured to the crankshaft must also be disposed concentrically within a stator. Thus, the rotor is rotatably received within the opening defined by the stator. Therefore an outer surface of the rotor and the inside diameter of the stator are separated by a substantially uniform, precise air gap, across which the magnetic flux generated by the components of the electric machine travels. Thus, and in order to ensure specific performance of the electric machine, the size of the air gap must not vary outside predetermined tolerances. Accordingly, the installation of such components in a hybrid vehicle requires forming a precise air gap between the rotor and the stator.

Currently, the stator and the rotor are aligned using techniques that require either the use of shims (e.g., trial and error assembly), or the use of specially designed and constructed stator/rotor components. Thus, there is a continuing need for apparatus and methods for aligning component parts of an electric machine.

SUMMARY

A tool is provided for aligning a stator with respect to a crankshaft of a hybrid vehicle. The tool comprises a central hub, alignment members slideably mated with the central hub for movement between a first position and a second position, and a manipulating means for moving the alignment members between the first and second positions. The central hub has a mating surface that is configured to secure the hub to the crankshaft such that the hub is aligned with an axis of rotation of the crankshaft. The first position defines a first peripheral dimension that is smaller than an inner dimension of the stator for removal therefrom. The second position defines a second peripheral dimension that is about equal to the inner dimension of the stator. Thus, the stator is moved to an aligned position with respect to the axis of rotation of the crankshaft when the tool is secured to the crankshaft and the aligning members are at the second position.

A method for installing an electric machine in a position to provide a driving force to one or more drivable wheels of a vehicle is provided. The method comprises securing an alignment device to a force transmitting device of the vehicle; disposing an inner opening of a stator over a plurality of alignment members of the alignment device; and re-positioning the stator to a preferred location with respect to the force transmitting device by re-positioning the plurality of alignment members of the alignment device.

A method is provided for installing an electric machine between an engine and a transmission of a hybrid vehicle. The method comprises securing a tool to a crankshaft such that a mating portion of the tool aligns the tool to an axis of rotation of the crankshaft; manipulating aligning members to a first peripheral dimension, wherein the first peripheral dimension is smaller than an inner dimension of a stator; positioning the inner dimension over the aligning members such that a first end of the stator is adjacent the engine and a second end is remote from the engine; manipulating the aligning members from the first peripheral dimension to a second peripheral dimension. The second peripheral dimension is substantially equal to the inner dimension of the stator such that the stator is in an aligned position with respect to the axis of rotation when the aligning members are at the second peripheral dimension. The method further comprises securing the stator in the aligned position by securing the first end of the stator to the engine; manipulating the aligning members to the first peripheral dimension; un-securing the tool from the crankshaft; and withdrawing the tool from the stator through the second end.

An apparatus for positioning a stator with respect to a crankshaft of a vehicle is also provided. The apparatus comprises a central member and a plurality of alignment members. The central member is configured for securement to the crankshaft. The alignment members each have an inner portion and an outer portion. The alignment members are movably mounted to the central member for movement in a range defined by a first position and a second position. The first position allows the outer portion of the alignment members to be received within an inside diameter of the stator. The second position causes the stator to be re-positioned with respect to the crankshaft. Here, the second position corresponds to a preferred location of the stator with respect to the crankshaft.

The above described and other features are exemplified by the following figures and detailed description.

BRIEF DESCRIPTION OF THE DRAWINGS

FIG. 3 is a cross sectional view of an electric machine configured for securement between an engine and a transmission of a vehicle;

FIG. 4 is a side elevational view of an exemplary embodiment of an aligning tool for aligning the components of an electric machine;

FIG. 5 is a view along lines 5—5 of FIG. 4;

FIG. 6 is a partial sectional view illustrating the aligning tool of FIG. 4 installed on a crankshaft;

FIG. 7 is a partial sectional view illustrating the stator housing being placed over the installed aligning tool, which is in its first position;

FIG. 8 is a partial sectional view illustrating the stator being concentrically aligned to the crankshaft by way of moving the aligning tool to its second position;

FIG. 9 is a partial sectional view illustrating the removal of the aligning tool from the crankshaft after being returned to its first position.

DETAILED DESCRIPTION

Figure 1:
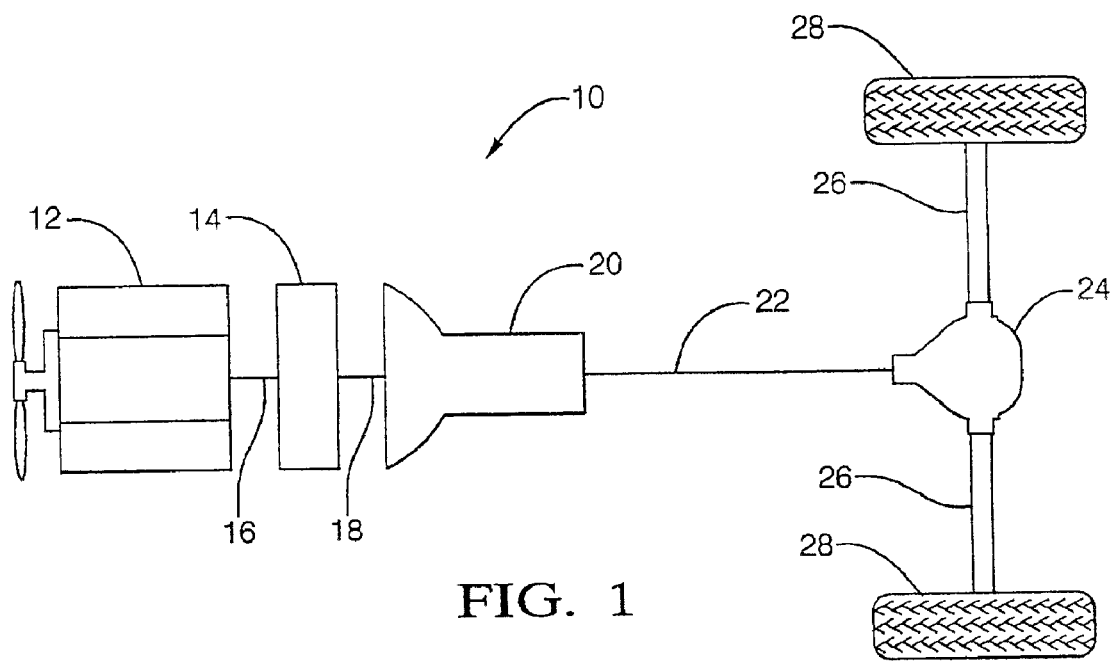
FIG. 1 is a schematic illustration of a vehicle driveline.

Referring now to FIG. 1, a propulsion system 10 of a vehicle is illustrated for purposes of explanation. The propulsion system 10 comprises an internal combustion engine 12 and an electric machine 14. Both the engine 12 and the electric machine 14 are configured to provide a means for providing a source of propulsion of the vehicle either alone, or in combination with one another.

The internal combustion engine 12 provides a driving force to a force transmitting device 16 (e.g., a crankshaft) in a known manner. The crankshaft 16 is coupled to a transmission 20 in a known manner. Intermediate to the engine 12 and the transmission 20 is an electric machine 14. Namely, the electric machine 14 is coupled to the crankshaft 16. The electric machine 14 is capable of providing a torque to the crankshaft 16 in order to facilitate starting the engine 12, and in order to provide or assist in providing the motive force to the vehicle. Alternately, the electric machine 14 is capable of receiving the driving force from the crankshaft 16 to generate an electrical output for meeting the electrical loads of the vehicle, as well as to charge the vehicle's battery. In alternate embodiments, the electric machine 14 is capable of regenerative braking by applying a force on the crankshaft 16 in order to slow the vehicle. During regenerative braking operations, the electric machine, in addition to providing a slowing force to the crankshaft, also generates an electrical output.

The electric machine 14 is coupled to a portion 18 of a driveshaft connecting the crankshaft to the transmission 20. The transmission transmits the driving force from the engine 12 and/or electric machine 14 to the drive shaft 22. The drive shaft 22 ultimately drives a pair of road wheels 28 through the use of a differential 24 and axles 26 in accordance with known practices. Accordingly, the engine 12 and/or electric machine 14 each are configured to provide a source of propulsion to the vehicle.

Figure 2:
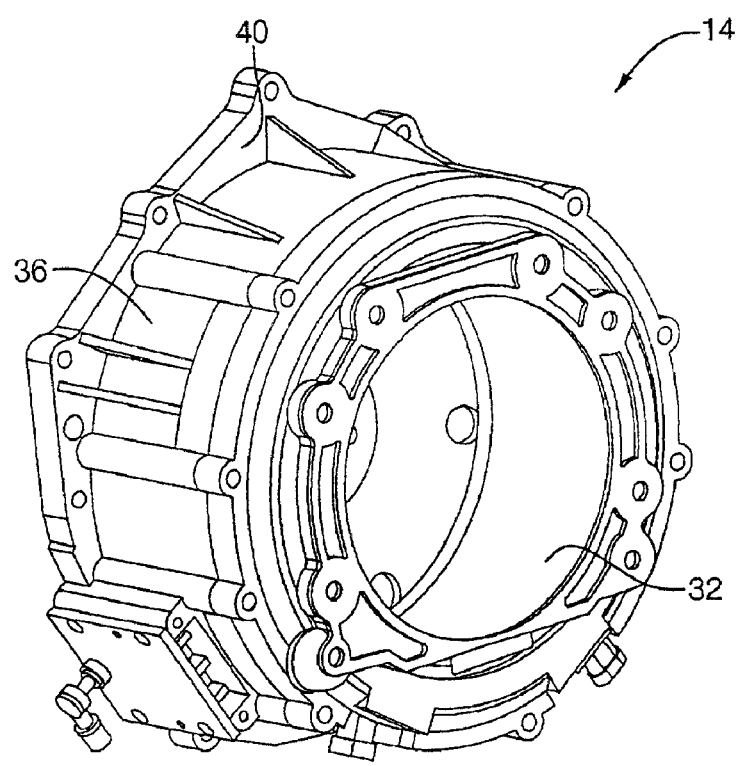
FIG. 2 is a perspective view of an electric machine contemplated for use in accordance with the present disclosure.

Referring now to FIGS. 2 and 3, an electric machine 14 is illustrated. The electric machine comprises a stator 30 and a rotor 32. The stator 30 comprises windings or coils 34. The stator 30 is secured to an inner surface of a stator housing 36. The housing is affixed to a portion of the engine 12 by way of bolts 38 that are inserted through a flange 40 of the housing. The housing 36 is affixed to the engine 12 such that the center of the stator 30 is common with the axis of rotation 42 of the crankshaft 16 (e.g., the stator is concentric to the crankshaft).

The rotor 32 is coupled to the crankshaft 16 by bolts 33 such that the axis of rotation of the rotor is common with the axis of rotation of the crankshaft 16 (e.g., the rotor is also concentric to the crankshaft). The rotor comprises permanent magnets 44 for generating a magnetic flux between the rotor and the windings of the stator. Accordingly, the rotor 32 and the stator 30 are separated by a substantially uniform, precise air gap 46, across which the magnetic flux travels.

Thus, the rotation of the crankshaft 16 by the engine 12 rotates the rotor 32 within the stator 30 such that an electrical output is generated. Alternately, inputting an electrical input to the coils 34 of the stator 30 cause magnetic fields to be generated such that the crankshaft 16 is rotated in order to facilitate starting the engine 12, and/or to provide/assist in providing the motive force to the vehicle. Additionally, the electric machine 14 is adapted to brake or slow the engine 12 by resisting the rotation of the rotor 32 within the stator 30, which is known as regenerative braking and which also generates an electrical output.

In order to ensure the desired performance of the electric machine 14, and the proper configuration of the magnetic fields, the air gap 46 must not vary outside predetermined tolerances. Accordingly, the installation of the rotor 32 and stator 30 in the vehicle requires forming the precise air gap 46. Namely, the stator 30 needs to be centered about the axis 42 of the crankshaft 16 such that the rotor 32 (when bolted to the crankshaft) is concentrically positioned within the stator.

In addition, the electric machine used in hybrid vehicles is considerably larger than typical alternators/generators installed in vehicles. Accordingly, the weight of these machines will affect the securement of the same.

It is an object of the present disclosure to provide an aligning tool useful in aligning the rotor and the stator to ensure that the air gap between the rotor surface and the inner dimension of the stator is within the predetermined tolerances. It is also an object of the present disclosure to provide a method of aligning the rotor and the stator to ensure that the air gap between the rotor surface and the inner dimension of the stator when assembled in the vehicle, is within the predetermined tolerances An exemplary embodiment of a method and a tool for aligning the stator 30 and the rotor 32 during assembly of the electric machine 14 to the engine 12 are illustrated in FIGS. 4–10. The aligning tool 48 is illustrated with reference to FIGS. 4 and 5. The method of aligning the stator 30 and the rotor 32 of the electric machine 14 during assembly to the engine 12 is illustrated with reference to FIGS. 6–10.

It should be recognized that the aligning tool 48 is described herein by way of example only finding use with a permanent magnet AC electric machine. Of course, the use of the aligning tool 48 with other electric machines requiring a stator and a rotor rotatably received therein are contemplated in accordance with the present disclosure.

Turning now to FIGS. 4 and 5, the aligning tool 48 comprises a central hub portion 50 and one or more alignment members 52. In a first exemplary embodiment, the aligning tool 48 comprises three alignment members 52 disposed about 120 degrees from one another. Of course, and as various applications may require, more or less than three alignment members 52 is contemplated. The alignment members 52 are slideably received in the hub 50 for movement between a first or retracted position 56, and a second or extended position 58 (illustrated in phantom). The aligning tool 48 also comprises a means 54 for moving or manipulating the alignment members 52 between the first and second positions (56 and 58). In the illustrated embodiment, the means for manipulating the alignment members 52 includes an actuating device 54, such as a knob or handle, which is threadably received in the hub 50. Of course, other means 54 for manipulating the position of the alignment members 52 are contemplated.

In the illustrated example, the knob 54 comprises an angled portion or cam face 60, and each alignment member comprises a push rod 62. As the knob 54 is threaded into the hub 50, the cam face 60 is in contact with the push rod 62 of each alignment member 52 to urge the rods, and thus the alignment members outward. A tension member 64 is disposed about the alignment members 52. As the alignment members 52 move outwards, the spring force of the tension member 64 is overcome to allow the alignment members to move to the second position 58. Conversely, as the knob 54 is threaded out of the hub 50, the force of the tension member 64 biases the alignment members 52 back in the direction of the first position 56.

It should be recognized that the alignment members 52 are described by way of example only as being returned to the first position 56 by way of the tension member 64. Of course, means other than the tension member for returning the alignment members 52 to the first position 56 are contemplated. For example, the angled portion 60 of the knob 54 can be operatively coupled to the push rods 62 such that as the knob 54 is threaded out of the hub 50, the push rods draw the alignment members 52 back to the first position 56.

Thus in the exemplary embodiment, the tool 48 is configured such the manipulation of the means 54 moves alignment members 52 between the first position 56, and the second position 58. The alignment members 52 are configured to expand radially or concentrically outward from the hub 50 by substantially the same distance or amount. Similarly, the alignment members 52 are configured to collapse radially or concentrically inward toward the hub 50 by substantially the same distance or amount.

The central hub 50 comprises a rotor-like mating surface 66 and holes 68. The rotor-like mating surface 66 matches the end of crankshaft 16 such that the central hub 50 is mateable with the crankshaft in place of rotor 32. Similarly, the holes 68 match the bolt pattern on the crankshaft 16. The mating surface 66 and the holes 68 ensure that the tool 48 is coupled to the crankshaft such that the tool is concentrically aligned with the rotation axis 42 of the crankshaft. Thus, the aligning tool 48 is secured to the crankshaft 16 in same manner that the rotor 32 is secured on the crankshaft. Namely, bolts 33 are inserted through holes 68 of the central hub 50 to secure the aligning tool 48 to the crankshaft 16.

In an exemplary embodiment, the aligning tool 48 further comprises a calibration screw 70. As provided above, the alignment members 52 are configured to move between the first and second positions (56 and 58). The calibration screw 70 is positioned at each alignment member 52 to adjust the interface between the alignment member and the push rod 62. Thus, the calibration screw 70 is adapted to adjust the distance that each alignment member 52 is radially extended from hub 50. The adjustment of calibration screw 70 ensures that each of the alignment members 52 extends substantially the same distance from the hub 50 in both the first and second positions (56 and 58).

The method of using the aligning tool 48 is described with respect to FIGS. 6–10. The tool 48 is affixed to crankshaft 16 in place of rotor 32, and the alignment members 52 are moved to the first position 56 as illustrated in FIG. 6. In the first position 56, the aligning members 52 have a first outer periphery that is less than an inner dimension 29 of the stator 30.

Turning now to FIG. 7, the housing 36 is placed over the installed tool 48 such that the alignment members 52 are positioned about the stator 30. In this position, the tool 48 supports the housing 36 and the stator 30 such that the bolts 38 can be inserted to loosely connect the housing to the engine 12. In this loosely connected position, the stator 30 is at least partially supported by the bolts, yet is still allowed to move with respect to the crankshaft 16.

Next, the knob 54 of the tool 48 is threaded into the hub 50, so that the cam face 60 in contact with the push rod 62 of each alignment member 52 urges the rods, and thus the alignment members radially outward. As the alignment members 52 move radially outward to the second position 58, an engagement portion of each member is in contact with the stator 30. When the alignment members 52 are in the second position 58, they have a second outer peripheral dimension that is about equal to the inner dimension 29 of the stator 30. In a first exemplary embodiment, the engagement portion of each of the alignment members 52 is configured for making contact with a portion of an inner surface of the stator 30. In the illustrated embodiment, the engagement portion is arcuate in shape. Of course, other shapes are contemplated for use with the present disclosure.

Since the housing 36 is only loosely connected to engine 12 at this point, as the alignment members 52 move toward the second position 58 they impart a force to the stator 30 sufficient to move the stator with respect to the crankshaft 16 as illustrated in FIG. 8. Because the tool 48 is aligned to the axis of rotation 42 of the crankshaft 16, the movement of alignment members 52 to the second position 58 moves the stator 30 until it is aligned with respect to the axis of rotation 42 of the crankshaft 16.

Once the stator 30 is aligned with respect to the axis 42 of crankshaft 16, the stator 30 is secured in this aligned position by tightening the bolts 38 to secure the stator 30 to the engine 12. At this point, the bolts 38 support the stator 30 and the housing 36 such that the alignment members 52 of the tool 48 can be returned to the first position 56. As discussed above, when alignment members 52 of tool 48 are in the first position 56, the tool has a first outer peripheral dimension that is smaller than the inner dimension 29 of the stator 30. Additionally, the first outer peripheral dimension is also smaller than an oversized opening 72 in the housing 36 as illustrated in FIG. 8.

The opening 72 is large enough such that the tool 48, at least in the first position 56 can be withdrawn from the housing 36 through the opening. Accordingly, the tool 48 is removed from the crankshaft 16 by loosening bolts 33 and withdrawing the tool along the axis 42 through the oversized opening 72 in the housing 36 as illustrated in FIG. 9.

Figure 10:
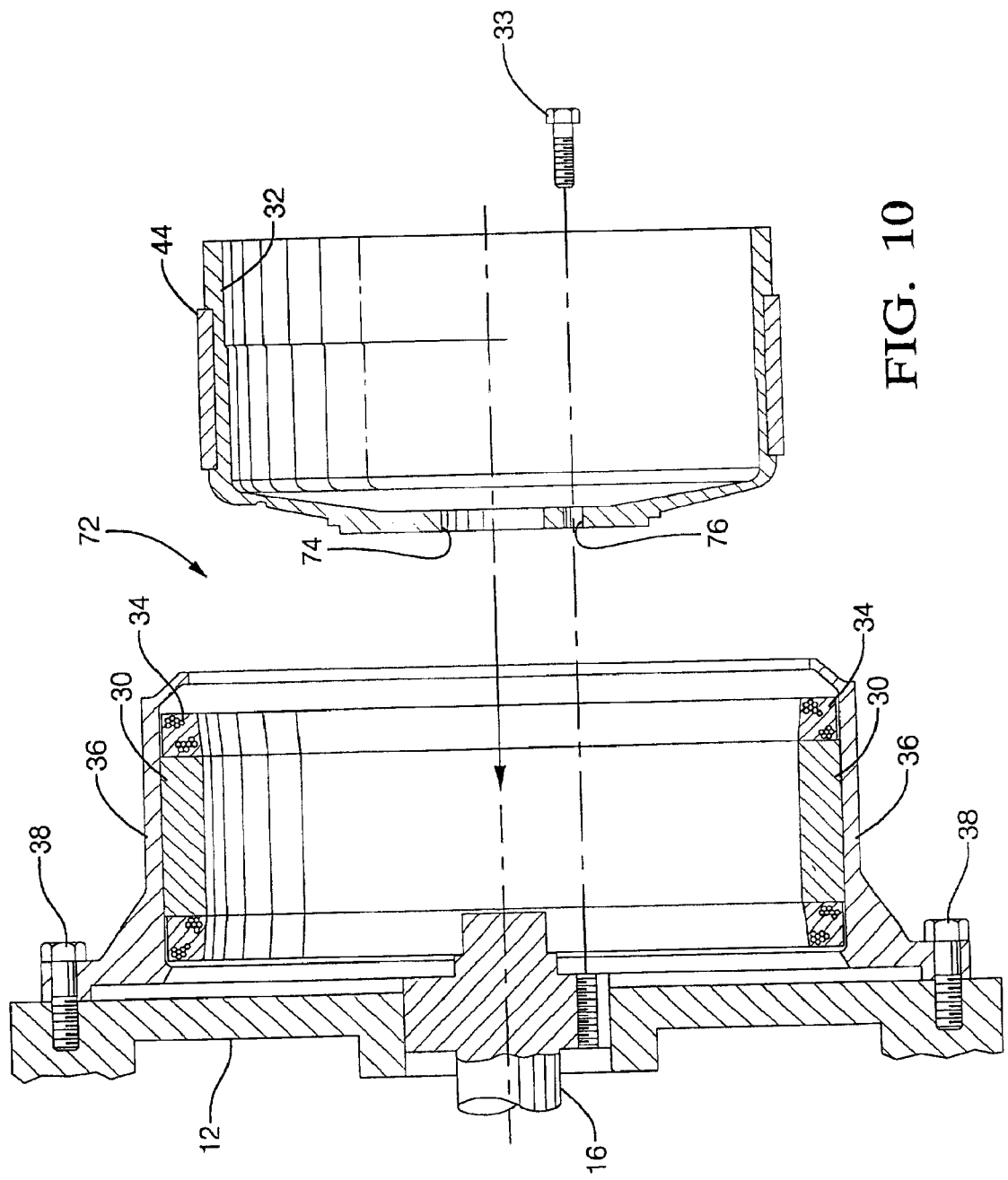
FIG. 10 is a partial sectional view illustrating the rotor being installed on the crankshaft.

Once the tool 48 has been removed, the rotor 32 is inserted through opening 72 as illustrated in FIG. 10. Finally, the rotor 32 is coupled to the crankshaft 16 by way of bolts 33 such that the axis of rotation of the rotor is aligned with the axis of rotation 42 of the crankshaft. Specifically, the rotor 32 comprises a mating surface 74 and bolt holes 76 which ensure that the rotor is coupled to the crankshaft 16, and such that the axis of rotation of the rotor is aligned with the rotation axis 42 of the crankshaft.

The mating surface 66 and bolt holes 68 of the tool 48 are substantially identical to the mating surface 74 and bolt holes 76 of the rotor 32. This ensures that the tool 48 is installed properly on the crankshaft as described above. Thus, the stator 30 is first aligned to the rotation axis 42 of the crankshaft 16 by way of tool 48, followed by aligning the rotor 32 to the rotation axis 42 of the crankshaft 16 by way of the mating surface 74 and the bolt holes 76. In this manner, the electric machine 14 is assembled to the engine 12 such that the air gap 46 is formed within the predetermined tolerances and such that the rotor 32 and the stator 30 are aligned to one another.

After the rotor 32 is coupled to crankshaft 16, the shaft 18 is connected to the crankshaft at the rotor in a known manner. Next, a transmission housing is positioned over the shaft 18 such that a first end of the transmission housing abuts the housing 36 at the opening 72, and the transmission housing is secured to the housing 36 where the housings abut one another.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tool for aligning a stator with respect to a crankshaft of a hybrid vehicle, comprising:

a central hub having a mating surface, said mating surface being configured to secure said central hub to said crankshaft;

a plurality of alignment members being configured to engage said stator and being slideably received within said central hub for movement between a first position and a second position, said second position being further away from said crankshaft than said first position wherein said stator is moved to an aligned position with respect to said crankshaft when said plurality of aligning members are at said second position; and means for moving said plurality of alignment members between said first position and said second position.

2. The tool as in claim 1, wherein said means for moving comprises:

an angled portion in contact with said plurality of alignment members, wherein movement of said angled portion causes said plurality of alignment members to move from said first position to said second position.

3. The tool as in claim 2, further comprising:

means for biasing said plurality of alignment members in the direction of said first position.

4. The tool as in claim 3, wherein said biasing means is overcome as said angled portion causes said plurality of alignment members to move from said first position to said second position.

5. The tool as in claim 4, wherein said biasing means is sufficient to return said plurality of alignment members to said first position.

6. The tool as in claim 2, further comprising:

a plurality of push rod members each having a first end and a second end, each of said plurality of said push rod members making contact at said first with said angled portion and at said second end with one of said plurality of alignment members, wherein movement of said angled portion causes each of said plurality of push rod members to move each of said plurality of alignment members from said first position to said second position.

7. The tool as in claim 6, further comprising:

a calibration screw threadably received within an opening of said plurality of alignment members, said calibration screw defining a limit of travel of said push rod member.

8. An apparatus for positioning a stator with respect to a crankshaft of a vehicle, comprising:

a central member being configured for securement to said crankshaft;

a plurality of alignment members each having an inner portion and an outer portion, said plurality of alignment members being movably mounted to said central member for movement in a range defined by a first position and a second position, said first position allowing said outer portion of each of said plurality of alignment members to be received within an inside diameter of said stator, said second position causing said stator to be re-positioned with respect to said crankshaft, said second position corresponding to a preferred location of said stator with respect to said crankshaft.

9. The apparatus as in claim 8, further comprising:

an actuating device for providing an urging force to said inner portions of said plurality of alignment members, said urging force moving said plurality of alignment members to said second position.

10. The apparatus as in claim 9, wherein said actuating device has a threaded portion being threadably engaged in a threaded opening of said apparatus such that rotation of said actuating device causes said actuating device to travel in a range defined by a first location and a second location.

11. The apparatus as in claim 10, wherein said actuating device has an angled surface that is configured to contact said inner portions of said plurality of alignment members as said actuating device moves from said first location to said second location.

12. The apparatus as in claim 11, wherein contact of said angled surface with said inner portions causes said plurality of alignment members to move towards said second position as said actuating device moves to said second location.

13. The apparatus as in claim 12, further comprising:

a biasing member configured to provide a biasing force to said plurality of alignment members, said biasing force being in the direction of said first position to bias said plurality of alignment members to said first position as said actuation device moves from said second location to said first location.

14. The apparatus as in claim 9, further comprising:

a calibration screw defining a limit of either said first position or said second position of said plurality of alignment members.

15. The apparatus as in claim 8, wherein said apparatus has three alignment members each being disposed about 120 degrees from one another.

16. The apparatus as in claim 8, wherein each of said plurality of alignment members has an engagement portion configured for making contact with a portion of an inner surface of said stator.

17. The apparatus as in claim 16, wherein said engagement portion is arcuate in shape.

18. The apparatus as in claim 17, further comprising:

a calibration screw being disposed in a threaded opening of said engagement portion, said calibration screw defining a limit of either said first position or said second position of said plurality of alignment members.

* * * * *